(12) United States Patent
Minato et al.

(10) Patent No.: US 7,333,729 B2
(45) Date of Patent: Feb. 19, 2008

(54) OPTICAL TRANSMITTER, OPTICAL RECEIVER AND OPTICAL TRANSMISSION SYSTEM USING SAME

(75) Inventors: Naoki Minato, Tokyo (JP); Satoko Kutsuzawa, Tokyo (JP); Saeko Oshiba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 569 days.

(21) Appl. No.: 10/673,441

(22) Filed: Sep. 30, 2003

(65) Prior Publication Data

US 2004/0062555 A1 Apr. 1, 2004

(30) Foreign Application Priority Data

Sep. 30, 2002 (JP) ............................. 2002-285351

(51) Int. Cl.
*H04J 14/02* (2006.01)
*H04J 14/08* (2006.01)
*H04B 10/00* (2006.01)

(52) U.S. Cl. ........................... 398/82; 398/84; 398/87; 398/101; 398/102; 398/161

(58) Field of Classification Search ................ 398/79, 398/82, 84, 87, 69, 101, 102, 161
See application file for complete search history.

(56) References Cited

U.S. PATENT DOCUMENTS 6,292,282 B1 9/2001 Mossberg et al.
6,381,053 B1 * 4/2002 Fathallah et al. ............. 398/99

FOREIGN PATENT DOCUMENTS

JP 2002-522997 7/2002

* cited by examiner

*Primary Examiner*—Dalzid Singh
(74) *Attorney, Agent, or Firm*—Venable LLP; Michael A. Sartori; Kyle D. Petaja

(57) ABSTRACT

To resolve problems, with the invention, an optical transmitter comprises an encoder for generating an optical signal obtained by encoding multi-wavelength pulses corresponding to sending data by use of a method of time spread/wavelength hopping in accordance with an encoding pattern of the encoder itself. The encoder concurrently executes time delay for every wavelength component at encoding, and time delay due to pre-compensation processing to pre-compensate for difference in propagation time for every wavelength component, occurring due to chromatic dispersion characteristics of a transmission line by α%. An optical receiver comprises a decoder for decoding the optical signal transmitted by the optical transmitter in accordance with a decoding pattern of the decoder itself. The decoder concurrently executes time delay for every wavelength component at decoding, and time delay due to dispersion equalization processing to compensate for difference in propagation time for every wavelength component, occurring due to chromatic dispersion characteristics of the transmission line by β%.

13 Claims, 8 Drawing Sheets

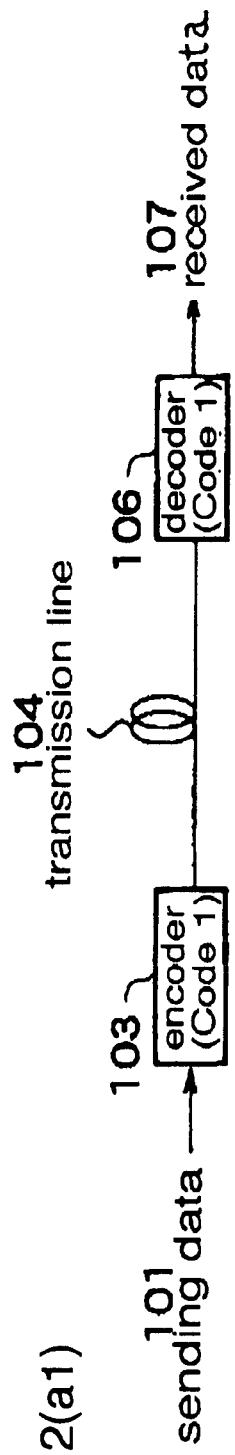
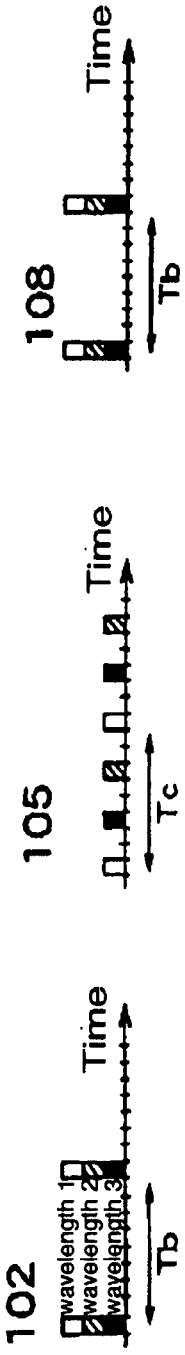
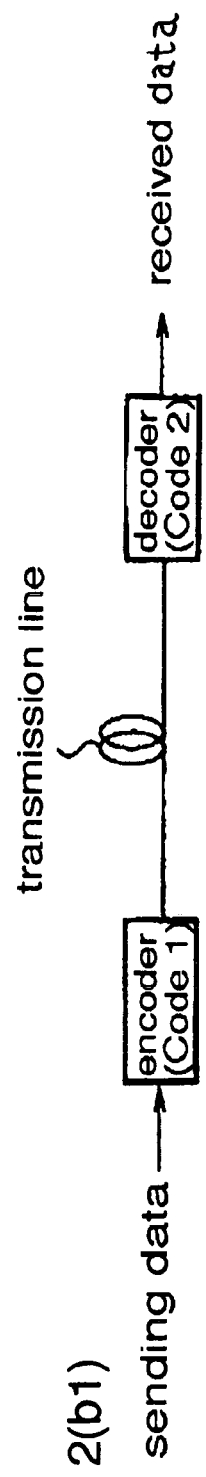
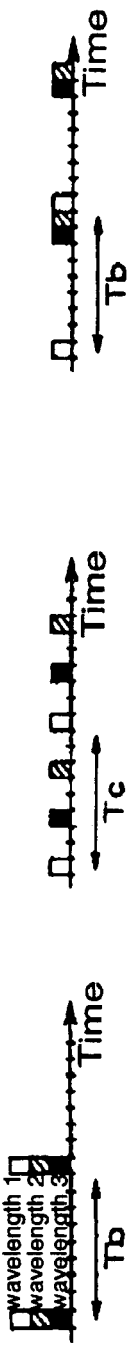

encoder decoder decoder encoder

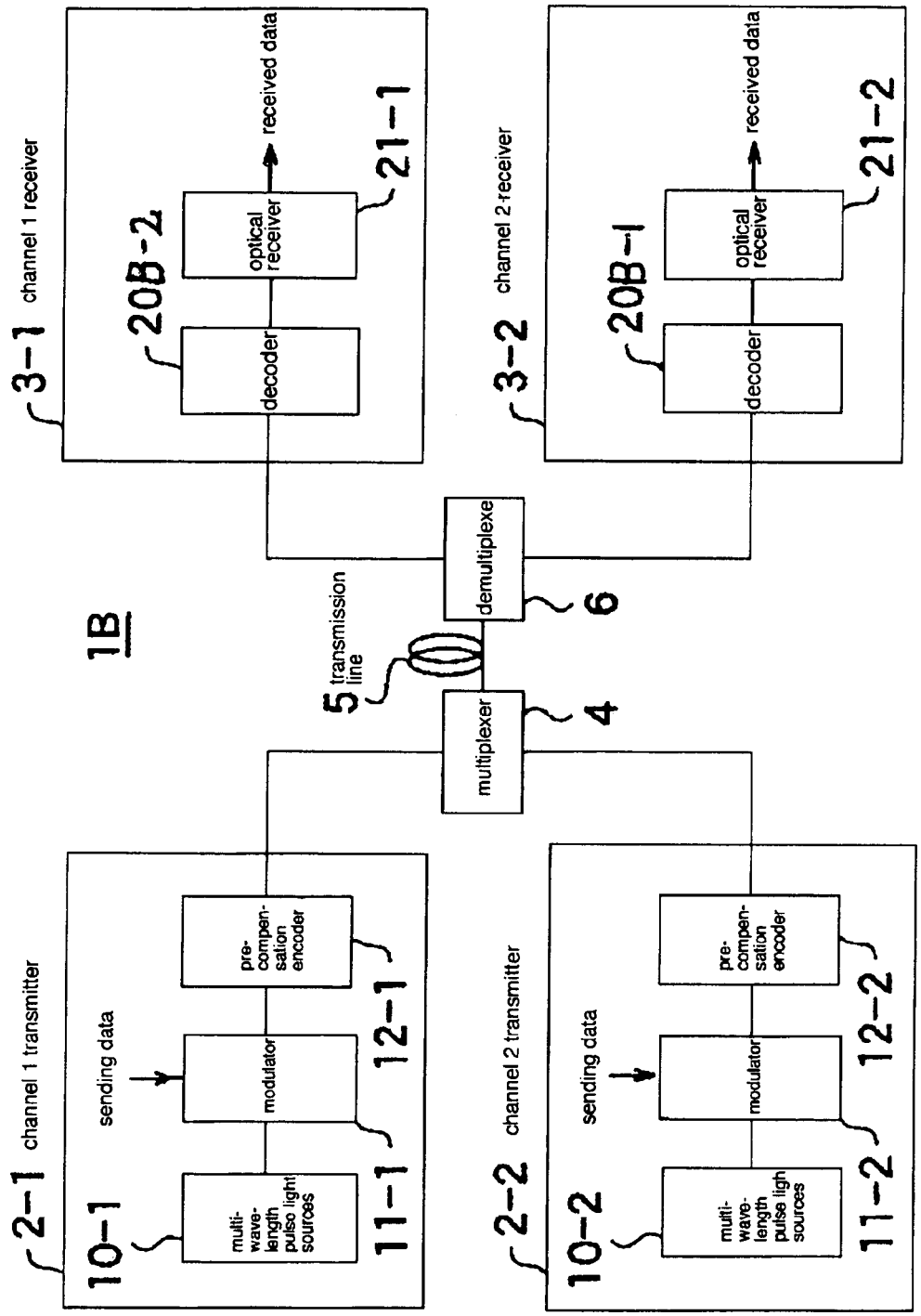

encoder decoder encoder decoder encoder, decoder configuration of variable delay device

OPTICAL TRANSMITTER, OPTICAL RECEIVER AND OPTICAL TRANSMISSION SYSTEM USING SAME

FIELD OF THE INVENTION

The present invention relates to an optical transmitter, optical receiver, and optical transmission system using the optical transmitter and optical receiver, which can be applied to, for example, an optical code division multiplexing (hereinafter referred to as OCDM) encoder, OCDM decoder, and OCDM transmission system, respectively.

BACKGROUND OF THE INVENTION

Attention has lately been focused on an OCDM method as a multiplexing method suited for attaining higher speed and higher capacity of an optical metro-access network. The OCDM method is a method of implementing multiplexing by encoding/decoding respective channels at a transmitter and a receiver, respectively, with the use of code groups orthogonal to each other.

As described hereunder, as the method of implementing encoding/decoding, there is available a method of time spread/wavelength hopping, using the so-called chirped Fiber Bragg Grating (hereinafter referred to as FBG), advantageous in terms of ease in implementation and manufacturing cost. The chirped Fiber Bragg Grating is made up of a plurality of different diffraction gratings, formed in the longitudinal direction of a fiber.

First, a process of encoding/decoding by time spread/wavelength hopping, as disclosed in JP, 2000-209186, A, is described with reference to FIG. 2. In FIG. 2, there is shown a case where a data period Tb is equal to a code period Tc by way of example, however, as shown in "Enhancement of Transmission Data Rates Incoherent FO-CDMA Systems" by X. Wang and K. T. Chang, OECC 2000, 14A2-5, p. 458 (2000), even if the data period Tb differs from the code period Tc, encoding/decoding is enabled.

On a transmitting side, sending data 101 in the form of optical signals are inputted to an encoder 103 as shown in FIG. 2($a$1). The sending data 101 (102) made up of optical signals with a predetermined number N1 (3 in FIG. 2) of wavelengths at $\lambda 1$ to $\lambda 3$ are subjected to intensity modulation according to the return-to-zero (RZ) format, in accordance with sending data made up of electric signals, creating valid data in a time slot (chip) for each of the data periods Tb as shown in FIG. 2($a$2). Respective wavelength components included in the sending data 101 are delayed (encoded) by specified time in accordance with a specified coding pattern (Code 1) at the encoder 103, respectively, to be thereby turned into an optical signal 105 with waveforms spread on a time axis as shown in FIG. 2($a$3).

The optical signal 105 obtained after undergoing time spread by delay time corresponding to the respective wavelength components arrives at a decoder 106 via a transmission line 104. At the decoder 106, the respective wavelength components of the optical signal 105 as inputted are delayed (decoded) by the specified time in accordance with the specified coding pattern (Code 1), and as shown in FIG. 2($a$4), there is obtained received data 107 (108) identical to the original sending data 101, with the respective wavelength components multiplexed within the same chip period after undergoing de-spread (delay time differences for the respective wavelength components are cancelled out) on the time axis.

FIGS. 2($b$1) through 2($b$4) show a case where the specified coding pattern of the encoder 103 differs from that of the decoder 106. Accordingly, if the coding patterns, for the transmitter and receiver, respectively, are found identical to each other by comparing the received data 107 (108), made up of optical signals, after subjected to, for example, photoelectric conversion, with a threshold value, original information group (sending data made up of electric signals) can be taken out while if the coding patterns, for the transmitter and receiver, respectively, differ from each other, the original information group cannot be taken out.

Further, even in the case of multiplexing the optical signal 105 of respective channels, subjected to time spread/wavelength hopping, at a multiplexer, and sending the same out to a transmission line, even if a multiplexed optical signal is given to the decoder 106 of a channel via a demultiplexer, it is possible to take out only desired received data (desired information group) matching a receiver's own coding pattern provided that orthogonality of the coding patterns is maintained. As is clear from description of the above-described principles of transmission, in the case of the time spread/wavelength hopping method, the optical signal 105 having a plurality of wavelengths needs to be transmitted.

However, because an optical fiber serving as a transmission line has chromatic dispersion characteristics, the optical signal arrives at the decoder 106 with various propagation time differences occurring among the respective wavelength components. Accordingly, there can occur a case where decoding cannot be properly implemented. Furthermore, in the case of a transmit/receive system executing multiplex transmission over a plurality of channels, the orthogonality between coding patters collapses due to the chromatic dispersion characteristics of an optical fiber, raising the risk of adversely affecting other channels.

In order to obviate such inconvenience, there is the need for compensating for propagation time difference for respective wavelength components, occurring due to the chromatic dispersion characteristics, by separate means. As a method of compensating for chromatic dispersion, a method whereby a dispersion compensation fiber and a phase conjugating device are inserted in a transmission line, and others have already been applied to many optical transmission systems.

In any case, however, problems have arisen in that there is an increase in the number of components, and in the scale of the OCDM encoder (transmitter) and/or OCDM decoder (receiver), resulting in higher cost of apparatuses.

Accordingly, it is highly desired to provide an optical transmitter, optical receiver, and optical transmission system, having a configuration capable of canceling out chromatic dispersions of a transmission line but capable of minimizing the scale of system elements, and reducing cost of manufacturing.

SUMMARY OF THE INVENTION

To resolve the problems described in the foregoing, the invention provides an optical transmitter comprising an encoder for generating an optical signal obtained by encoding multi-wavelength pulses corresponding to sending data by use of a method of time spread/wavelength hopping in accordance with an encoding pattern of the encoder itself. The encoder concurrently executes time delay for every wavelength component at encoding, and time delay due to pre-compensation processing to pre-compensate for difference in propagation time for every wavelength component, occurring due to chromatic dispersion characteristics of a transmission line by α%. The invention further provides an optical receiver comprising a decoder for decoding the optical signal transmitted by the optical transmitter in accordance with a decoding pattern of the decoder itself. The decoder concurrently executes time delay for every wavelength component at decoding, and time delay due to dispersion equalization processing to compensate for difference in propagation time for every wavelength component, occurring due to chromatic dispersion characteristics of the transmission line by β%.

BRIEF DESCRIPTION OF THE DRAWINGS

FIG. 2 is a schematic representation for illustrating the principle of a method of time spread/wavelength hopping;

FIG. 7 is a block diagram showing an overall configuration of a third embodiment of an OCDM transmission system according to the invention;

DETAILED DESCRIPTION OF THE PREFERRED EMBODIMENTS OF THE INVENTION (A) First Embodiment A configuration of a first embodiment of the invention is described hereinafter with reference to the accompanying drawings.

Figure 1:
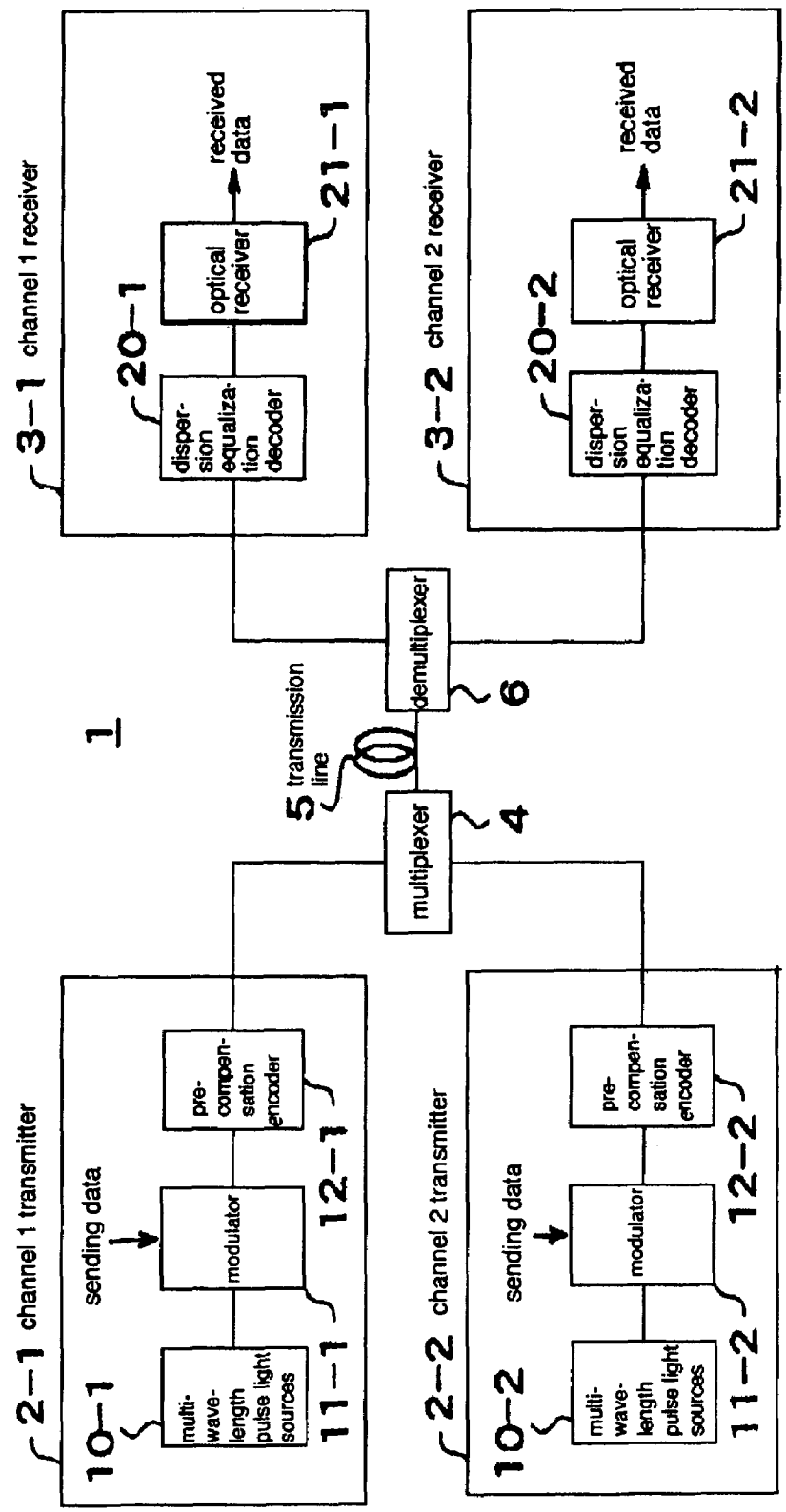
FIG. 1 is a block diagram showing an overall configuration of a first embodiment of an OCDM transmission system according to the invention.

FIG. 1 is a block diagram showing an overall configuration of an OCDM transmission system according to the first embodiment of the invention. In FIG. 1, the OCDM transmission system 1 according to the first embodiment executes multiplex transmission over two channels, and comprises a channel 1 receiver (OCDM decoder) 3-1 and a channel 2 receiver (OCDM decoder) 3-2 as well as a channel 1 transmitter (OCDM encoder) 2-1 and channel 2 transmitter (OCDM encoder) 2-2.

Further, the OCDM transmission system 1 comprises a multiplexer 4 for multiplexing optical signals (optical signals after time spread/wavelength hopping) outputted from the channel 1 transmitter 2-1 and channel 2 transmitter 2-2, respectively, a transmission line 5 for transmitting an output optical signal (multiplexed optical signal) from the multiplexer 4, and a demultiplexer 6 for demultiplexing the multiplexed optical signal received from the transmission line 5 into two signals to be distributed between the channel 1 receiver 3-1 and channel 2 receiver 3-2. The transmission line 5 is made up of an optical fiber having chromatic dispersion characteristics. In the case of an actual transmission system, there is a case where an optical amplifier and so on are installed in the middle of a transmission line thereof. The transmission line 5 according to the present embodiment is meant to include such a configuration.

The transmitters 2-1, 2-2 comprise multi-wavelength pulse light sources 10-1, 10-2, modulators 11-1, 11-2, and pre-compensation encoders 12-1, 12-2, respectively.

The multi-wavelength pulse light sources 10-1, 10-2 have such configurations as to send out multi-wavelength pulses with a wavelength number N1 of wavelength components at $\lambda 1, \lambda 2, \lambda 3 \ldots \lambda N1$ to be delivered to the modulators 11-1, 11-2, respectively. The multi-wavelength pulses have a pulse width corresponding to chip time, and a pulse interval corresponding to a data period Tb.

The modulators 11-1, 11-2 cause the multi-wavelength pulses from the multi-wavelength pulse light sources 10-1, 10-2 to undergo intensity modulation correspondingly to sending data made up of electric signals before delivering the same to the pre-compensation encoders 12-1, 12-2, respectively.

The respective pre-compensation encoders 12-1, 12-2 are to provide respective wavelength components of output optical signals from the light modulators 11-1, 11-2, respectively, with different delay time, respectively. Herein, delay time given to the respective wavelength components is the sum of time determined correspondingly to an encoding pattern of a relevant channel and time for pre-compensation processing, with the chromatic dispersion of the transmission line 5 being taken into account. The respective pre-compensation encoders 12-1, 12-2 are not for sequentially executing time delay for encoding (time spread/wavelength hopping) and time delay for pre-compensation, but are optical members for uniting these time delays together and concurrently processing both.

The encoding pattern of the pre-compensation encoder 12-1 for the channel 1 is set so as to be orthogonal to, and differ from the encoding pattern of the pre-compensation encoder 12-2 for the channel 2. Propagation time difference between the respective wavelength components due to the chromatic dispersion of the transmission line 5 is eliminated by a pre-compensation function of the pre-compensation encoder 12-1 or 12-2, and a dispersion equalization function of dispersion equalization decoders 20-1 or 20-2, to be described later. Combination of an elimination ratio of the pre-compensation function with an elimination ratio of the dispersion equalization function can be set at any suitable ratio, and is set at a ratio of 50%:50% in the case of the present embodiment.

The optical signals of the respective channels, outputted from the respective pre-compensation encoder 12-1, 12-2 are multiplexed by the multiplexer 4, delivered to the demultiplexer 6 after passing through the transmission line 5 to be demultiplexed into two signals, thereby arriving at the receivers 3-1 and 3-2 for the respective channels.

The receivers 3-1, 3-2 have the dispersion equalization decoders 20-1, 20-2, and optical receivers 21-1, 21-2, respectively.

The respective dispersion equalization decoders 20-1, 20-2 are to provide respective wavelength components of an input optical signal with different delay time, respectively.

Herein, the delay time given to the respective wavelength components is the sum of time determined correspondingly to a decoding pattern (the encoding pattern) of the relevant channel and time for dispersion equalization with the chromatic dispersion of the transmission line 5 being taken into account. The respective dispersion equalization decoders 20-1, 20-2, are optical members not for sequentially executing time delay for decoding and time delay for dispersion equalization, but for uniting these time delays together and concurrently processing both.

In this case, the decoding pattern of the dispersion equalization decoder 20-1 for the channel 1 corresponds to the encoding pattern of the pre-compensation encoder 12-1 for the channel 1 while the decoding pattern of the dispersion equalization decoder 20-2 for the channel 2 corresponds to the encoding pattern of the pre-compensation encoder 12-2 for the channel 2.

The optical receivers 21-1, 21-2 are for converting respective optical signals from the dispersion equalization decoder 20-1, 20-2 into electric signals (received data), respectively. In this connection, the electric signals (received data) as obtained are compared with a predetermined threshold value (not shown), and those meeting the threshold value are determined as final received data.

Now, operation of the OCDM transmission system 1 according to the first embodiment is described hereinafter with reference to FIG. 1.

With the channel 1 transmitter 2-1, pulsed light sent out from the multi-wavelength pulse light source 10-1 is caused to undergoes intensity modulation by the modulator 11-1 in accordance with sending data made up of electric signals. Encoding and pre-compensation of output optical signal from the modulator 11-1 are executed by the pre-compensation encoder 12-1. With the channel 2 transmitter 2-2 as well, data modulation, encoding and pre-compensation are similarly executed using an encoding pattern different from that for the channel 1.

The optical signals outputted from the channel 1 transmitter 2-1 and the channel 2 transmitter 2-2, respectively, are multiplexed by the multiplexer 4 before sent out to the transmission line 5. Optical signals having passed through the transmission line 5 are demultiplexed by the demultiplexer 6 to be thereby delivered to an input of the channel 1 receiver 3-1 and an input of channel 2 receiver 3-2, respectively.

With the channel 1 receiver 3-1, a distributed optical signal is decoded by the dispersion equalization decoder 20-1 in accordance with the decoding pattern identical to the encoding pattern of the pre-compensation encoder 12-1, and concurrently undergoes the dispersion equalization. The optical receiver 21-1 converts an input optical signal into an electric signal, thereby taking out received data.

With the channel 2 receiver 3-2 as well, received data is taken out according to a similar procedure by use of the dispersion equalization decoder 20-2 in accordance with the decoding pattern identical to the encoding pattern used on the channel 2 transmitter 2-2 side.

Next, there is described a method for selecting delay time for each of the wavelength components by the pre-compensation encoders 12-1, 12-2, and the dispersion equalization decoders 20-1, 20-2. System parameters used in description given hereinafter are shown in Table 1 below.

TABLE 1

| ITEM | SYMBOL | REMARKS |
|---|---|---|
| data period | Tb | data rate = 1/Tb (bit/s) |
| code period | Tc | |
| no. of chips in one period | Nc | |
| no. of wavelengths | N1 | |
| wavelength used | $\lambda_i$ (i = 1, . . . , N1) | |
| time spread position of $\lambda_i$ | $T_i$ | $T_i = (m_i/N_c) * T_c$, $m_i < N_c$ $m_i$:integer $\forall$I |
| transmission distance | Z | |
| chromatic dispersion | D | |

With the pre-compensation encoders, time difference for respective wavelengths $\lambda_i$ according to a given encoding pattern is expressed by relative time difference $\Delta$ Tci from the shortest wavelength $\lambda 1$ as shown by the following expression (1)

$$\Delta Tci = Ti - T1 \quad (1)$$

In the case where decoding is executed by the dispersion equalization decoders 20-1, 20-2, respectively, in accordance with a decoding pattern corresponding to an encoding pattern on the sending side, a relative time difference of respective wavelengths $\lambda_i$, from the shortest wavelength $\lambda 1$, in the decoding pattern, is expressed by the following expression (2)

$$-\Delta Tci \quad (2)$$

Further, based on the definition of the chromatic dispersion, time difference $\Delta$ Tti between wavelength components after propagation by a distance z on the transmission line 5 can be expressed by the following expression (3). Herein, the time difference between the wavelength components is shown as a relative time difference from the shortest wavelength $\lambda 1$ component.

$$\Delta Tti = Dz(\lambda_i - \lambda 1) \quad (3)$$

From the expression (1) through (3), if time delay as shown by the following expression (4) or (5) is given to the respective wavelength components by the pre-compensation encoders 12-1, 12-2 and the dispersion equalization decoders 20-1, 20-2, respectively, dispersion equalization can be effected.

$$\Delta Tci - a \cdot \Delta Tti \quad (4)$$

$$-\Delta Tci - (1-a) \cdot \Delta Tti \quad (5)$$

where $0 \leq$ factor "a" $\leq 1$

In the case of a=0, it means that mutual cancellation of chromatic dispersions is effected only by the dispersion equalization with the dispersion equalization decoders 20-1, 20-2, and a configuration in that case will be described in detail with reference to a second embodiment of invention, described later.

In the case of a=1, it means that mutual cancellation of the chromatic dispersions is effected only by the pre-compensation function of the pre-compensation encoders 12-1, 12-2, and a configuration in that case will be described in detail with reference to a third embodiment of invention, described later.

Figure 3A:
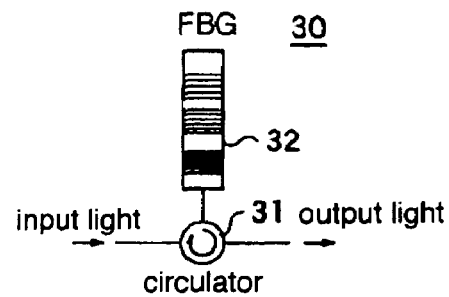
FIG. 3 is a schematic illustration of an optical member for use in pre-compensation at encoders in FIG. 1 and in dispersion equalization at decoders in FIG. 1.
Figure 3:
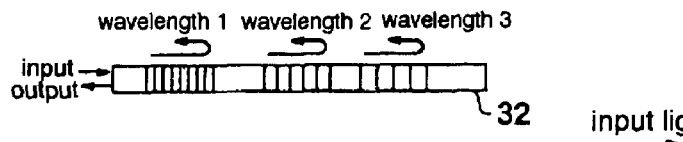
Figure 3:
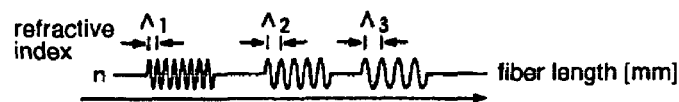

FIG. 3 shows an example of an optical member that can be applied to the pre-compensation encoders 12-1, 12-2 and the dispersion equalization decoders 20-1, 20-2, respectively, in other words, a delay-by-wavelength optical member 30 providing the respective wavelength components with different delay time.

As shown in FIG. 3(a), the delay-by-wavelength optical member 30 has a circulator 31 and a FBG 32. In the case of three wavelengths, λ1, λ2, and λ3, as shown in FIG. 3(b2) by way of example, the FBG 32 has refractive-index-variable portions corresponding to respective periods of the wavelengths λ1, λ2, and λ3. As shown in FIG. 3(b1), respective wavelength components of the wavelengths λ1, λ2, and λ3 are reflected at the refractive-index-variable portions corresponding to the respective wavelengths. That is, round trip time from an input/output end of the FBG 32 to the respective refractive-index-variable portions thereof vary for each of the wavelengths λ1, λ2, and λ3, so that different delay time can be given to each of the wavelength components, corresponding to the respective wavelengths.

More specifically, the FBG 32 has a function of acting as diffraction gratings causing refractive index of the core of an optical fiber to be periodically changed in the direction of the optical axis. Relationship between a grating pitch Λi and a reflected wavelength λi can be expressed by the following expression (6) if the refractive index of the FBG 32 is defined "n".

$$\lambda i = 2 \cdot n \cdot \Lambda i \quad (6)$$

Accordingly, by determining a grating pitch of a diffraction grating, at a specific position inside the optical fiber on the basis of the expression (6) described above, it is possible to cause light only at a specific wavelength corresponding to the grating pitch to be reflected at the specific position.

If a plurality of diffraction gratings each having a different grating pitch are provided at various positions over a length of an optical fiber, the optical fiber can reflect incident light so as to have a plurality of wavelength components corresponding to the respective grating pitches. Since the position of the respective diffraction gratings corresponding to respective wavelength components varies, there occurs difference in transmission distance in the optical fiber between the wavelength components, and the difference represents difference in delay time between the wavelength components, as reflected in the optical fiber to be outputted.

Accordingly, as shown in FIG. 3(a), by delivering input light via the circulator 31 to the FBG 32 with reflection positions of respective wavelengths, disposed therein in accordance with an encoding pattern, and by sending out reflected light via the circulator 31, it is possible to obtain output light as encoded by the method of time spread/wavelength hopping.

Similarly, by disposing the reflection positions of the respective wavelengths in the FBG 32 in accordance with a decoding pattern, decoding can be implemented according to the method of time spread/wavelength hopping.

If the time delay for each of the wavelength components as expressed by the above-described expression (4) and (5) is expressed in terms of the positions of the respective diffraction gratings of the FBG 32, the following expressions (7) and (8) are obtained. The expressions (7) and (8) express a relative position of the respective wavelength components, from the shorted wavelength λ1 component. In expressions (7) and (8), "c" represents the speed of light.

$$(\Delta T c i - a \cdot \Delta T t i) \cdot c / 2 \cdot n \quad (7)$$

$$\{-\Delta T c i - (1 - a) \cdot \Delta T t i\} \cdot c / 2 \cdot n \quad (8)$$

System specification is shown in Table 2 below, and there is described a specific example of the FBG 32 provided with coding wherein as for the parameter $m_i$ in the Table 1, (m1, m2, m3, m4, m5)=(0, 15, 5, 20, 10). Herein, a mutual cancellation ratio of the chromatic dispersions by pre-compensation is equal to a mutual cancellation ratio of the chromatic dispersions by dispersion equalization (a=1−a=0.5).

TABLE 2

| ITEM | VALUE | UNIT | REMARKS |
| --- | --- | --- | --- |
| multplex no. | 2 | | |
| data period | 400 | ps | data rate = 2.5 Gbit/s |
| code period | 400 | Ps | |
| code group in use | Prime-hop group | | $N_c = 25$<br>$N_1 = 5$ |
| center wavelength of signal light | 1552 | nm | |
| interval between adjacent wavelengths | 0.8 | nm | |
| transmission distance | 100 | km | Single Mode Fiber (D = 18 ps/nm/km) |
| the speed of light in a vacuum | 2.997925 × 10⁸ | m/s | |
| average refractive index of FBG | 1.48 | | |

Multi-wavelength signal light has wavelengths at (λ1, λ2, λ3, λ4, λ5)=(1550.4, 1551.2, 1552.0, 1552.8, 1553.6) [nm].

Accordingly, based on the expression (6) described above, the grating pitch Λi of the diffraction gratings becomes as follows.

(Λ1, Λ2, Λ3, Λ4, Λ5)=(4.589, 4.592, 4.594, 4.596, 4.599) [μm]

Further, since the parameter $m_i$ in the Table 1 above is (m1, m2, m3, m4, m5)=(0, 15, 5, 20, 10), ΔTci in the expression (1) as previously described becomes as follows.

(ΔTc1, ΔTc2, ΔTc3, ΔTc4, ΔTc5)=(0, 240, 80, 320, 160) [ps]

Based on the wavelengths of the multi-wavelength signal light, ΔTti in the expression (3) as previously described becomes as follows.

(Tt1, Tt2, Tt3, Tt4, Tt5)=(0, 1445, 2890, 4336, 5781) [ps].

As a result, a configuration of dispositions of the diffraction gratings of dispersion equalization decoder as well as the pre-compensation encoder as found by use of the expressions (7) and (8) described above is as shown in FIG. 4.

As described in the foregoing, with the first embodiment, there is provided a configuration wherein the chromatic dispersions of the transmission line (optical fiber) 5 cancel each other out, so that highly accurate transmission of optical signals is enabled.

Further, instead of installing a configuration for exclusive use as the configuration for canceling out the chromatic dispersions of the transmission line (optical fiber) 5, there are installed the encoders and decoders, capable of canceling out the chromatic dispersions in the course of inherent operation thereof, thereby enabling reduction in cost as well as reduction in scale of an optical transmitter and optical receiver to be implemented.

The present embodiment is made up of the encoders having the pre-compensation function and the decoders having the dispersion equalization function, utilizing the FBG, respectively. Because work for the mutual cancellation of the chromatic dispersions, to be executed by the FBG, is divided between the FBG on the encoder side and the FBG on the decoder side, a length of the respective FBGs, necessary for the mutual cancellation of the chromatic dispersions, is rendered shorter as compared with a case of a configuration wherein the chromatic dispersions are cancelled out with a FBG at one spot, so that it also becomes possible to facilitate fabrication of the FBG.

(B) Second Embodiment

Now, a second embodiment of the invention is described with reference to the drawings.

Figure 5:
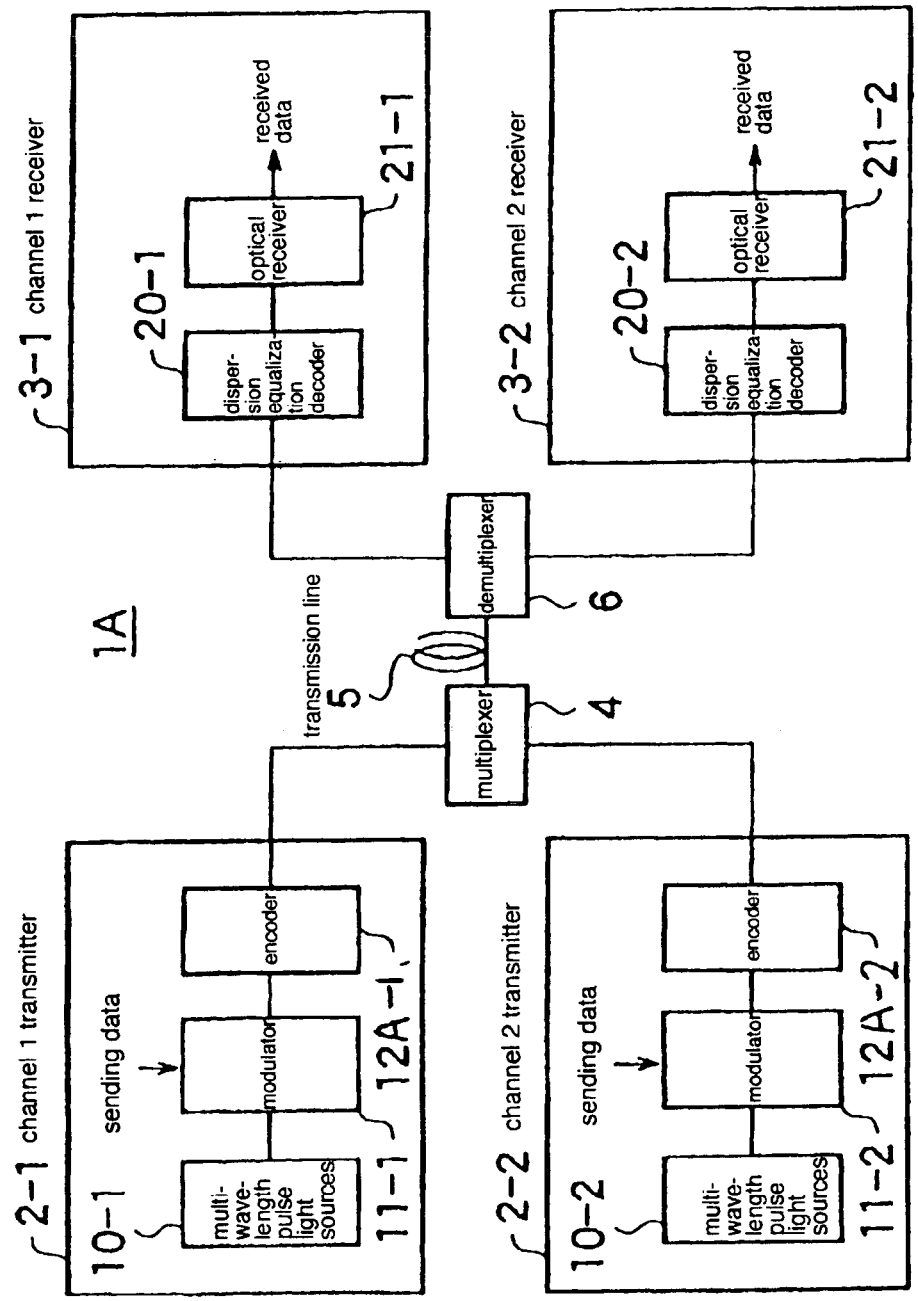
FIG. 5 is a block diagram showing an overall configuration of a second embodiment of an OCDM transmission system according to the invention.

FIG. 5 is a block diagram showing an overall configuration of an OCDM transmission system according to the second embodiment of the invention, and in the figure, parts corresponding to those of the first embodiment are denoted by like reference numerals.

The OCDM transmission system according to the second embodiment differs in configuration from the same according to the first embodiment in that encoders 12A-1, 12A-2 for executing processing for time spread/wavelength hopping, installed in transmitters 2-1, 2-2, respectively, doe not have the pre-compensation function intended for mutual cancellation of chromatic dispersions. That is, the second embodiment has a configuration wherein dispersion equalization decoders 20-1 and 20-2, installed receivers 3-1 and 3-2, respectively, cancel out all the chromatic dispersions occurring in a transmission line 5. The configuration of the second embodiment corresponds to a configuration in the case of the factor "a" in the expression (4) and (5) being 0.

In the case of making up the encoders 12A-1, 12A-2, making use of a FBG, respectively, use is made of the FBG for executing time delay only in accordance with an encoding pattern while in the case of making up the dispersion equalization decoders 20-1 and 20-2, making use of a FBG, respectively, use is made of the FBG for executing both time delay in accordance with a decoding pattern, and time delay for canceling out 100% of the chromatic dispersions.

Figure 6A:
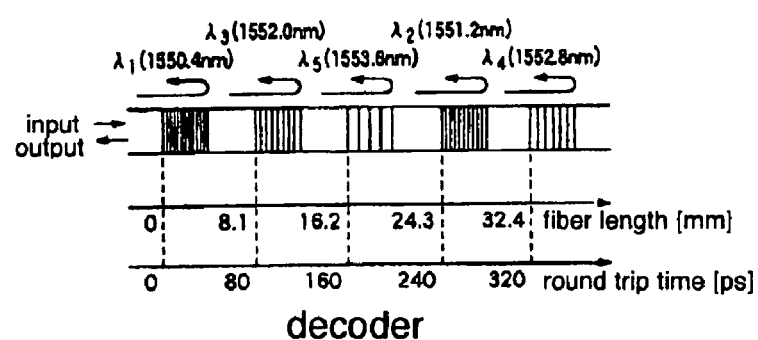
FIG. 6 is a schematic illustration of a design example of a FBG serving as an optical member applied to the second embodiment.
Figure 6B:
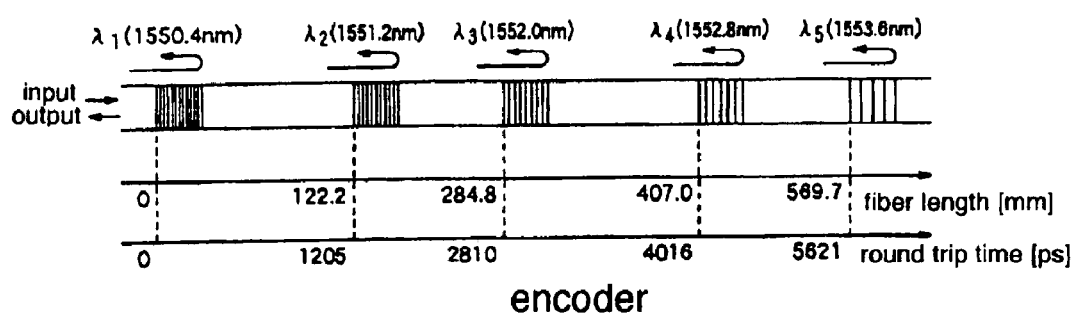

FIG. 6 shows a specific example of dispositions of diffraction gratings of the FBG 32, applied to the dispersion equalization decoders 20-1, 20-2, respectively, as well as the encoders 12A-1, 12A-2, respectively, in the case of the system specification being under the conditions shown in Table 2 as above. Since a grating pitch Λi of the diffraction gratings is the same as that shown in FIG. 4, description thereof is omitted.

The second embodiment as well is provided with a configuration wherein the chromatic dispersions of the transmission line (optical fiber) 5 cancel each other out, so that highly accurate transmission of optical signals is enabled.

Further, instead of installing a configuration for exclusive use as the configuration for canceling out the chromatic dispersions of the transmission line (optical fiber) 5, there are installed the decoders, capable of canceling out the chromatic dispersions in the course of inherent operation thereof, thereby enabling reduction in cost as well as reduction in scale of the optical transmitter and optical receiver to be implemented.

With the second embodiment, a part of an optical transmission system, on the transmitter side, can be down-sized, so that there can be provided a more effective configuration particularly in an asymmetrical environment where the part of the optical transmission system, on the transmitter side, is more restricted in space than that on the receiver side, due to a problem of installation space, and so forth, or in a circumstance where chromatic dispersions in an added part of the transmission line need to be compensated for when a terminal is added to the existing system.

Further, since mutual cancellation of the chromatic dispersions in the transmission line (optical fiber) 5 is implemented by the dispersion equalization decoders only, it is sufficient to design decoders only, taking into consideration the mutual cancellation of the chromatic dispersions, so that the present embodiment has an advantageous effect in that designing can be made with ease.

(C) Third Embodiment

Next, a third embodiment of the invention is described with reference to the drawings.

FIG. 7 is a block diagram showing an overall configuration of an OCDM transmission system according to the third embodiment of the invention, and in the figure, parts corresponding to those of the first embodiment are denoted by like reference numerals.

The OCDM transmission system according to the third embodiment differs in configuration from the same according to the first embodiment in that decoders 20B-1, 20B-2, installed in receivers 3-1, 3-2, respectively, do not have the dispersion equalization function. That is, the third embodiment has a configuration wherein pre-compensation encoders 12-1, 12-2, installed in transmitters 2-1, 2-2, respectively, cancel out all the chromatic dispersions occurring in the transmission line 5. The configuration of the third embodiment corresponds to a configuration in the case of the factor "a" in the expression (4) and (5) being 1.

In the case of making up the pre-compensation encoders 12-1, 12-2, making use of a FBG, respectively, use is made of the FBG for executing both time delay in accordance with an encoding pattern, and time delay for pre-compensation canceling out 100% of the chromatic dispersions while in the case of making up decoders 20B-1 and 20B-2, making use of a FBG, respectively, use is made of the FBG for executing only time delay in accordance with a decoding pattern.

Figure 8A:
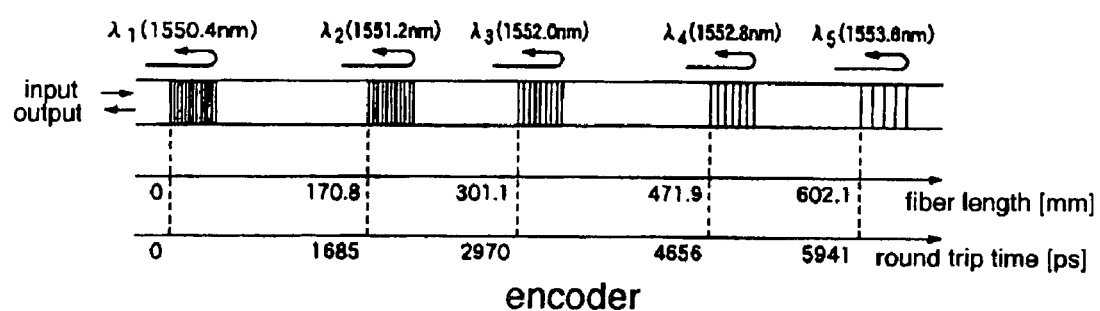
FIG. 8 is a schematic illustration of a design example of a FBG serving as an optical member applied to the third embodiment.
Figure 8B:
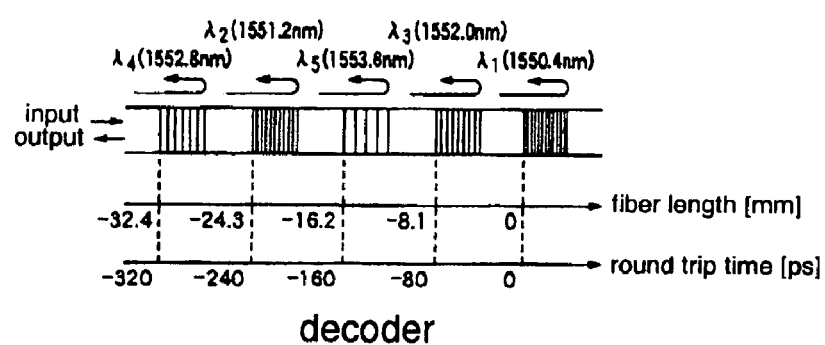

FIG. 8 shows a specific example of dispositions of diffraction gratings of the FBG 32, applied to the decoders 20B-1, 20B-2, respectively, as well as the pre-compensation encoders 12-1, 12-2, respectively, in the case of the system specification being under the conditions shown in Table 2 as above. Since a grating pitch Λi of the diffraction gratings is the same as that shown in FIG. 4, description thereof is omitted.

The third embodiment as well is provided with a configuration wherein the chromatic dispersions of the transmission line (optical fiber) 5 cancel each other out, so that highly accurate transmission of optical signals is enabled.

Further, instead of installing a configuration for exclusive use as the configuration for canceling out the chromatic dispersions of the transmission line (optical fiber) 5, there are installed the encoders, capable of canceling out the chromatic dispersions in the course of inherent operation thereof, thereby enabling reduction in cost as well as reduction in scale of the optical transmitter and optical receiver to be implemented.

With the third embodiment, parts of an optical transmission system, on the receiver side, can be down-sized, so that there can be provided a more effective configuration particularly in an asymmetrical environment where the part of the optical transmission system, on the receiver side, is more restricted in space than that on the transmitter side, due to a problem of installation space, and so forth, or in a circumstance where chromatic dispersions in an added part of the transmission line need to be compensated for when a terminal is added to the existing system.

Further, since mutual cancellation of the chromatic dispersions in the transmission line (optical fiber) 5 is implemented by the pre-compensation encoders only, it is sufficient to design encoders only, taking into consideration the mutual cancellation of the chromatic dispersions, so that the present embodiment has an advantageous effect in that designing can be made with ease.

(D) Fourth Embodiment

Next, a fourth embodiment of the invention is described with reference to the drawings.

Figure 4A:
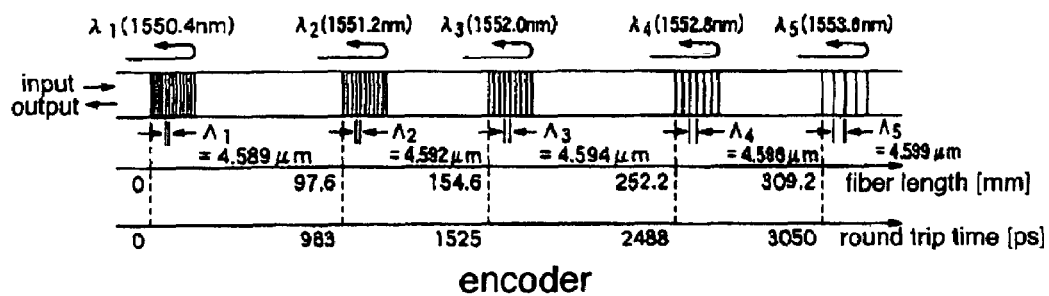
FIG. 4 is a schematic illustration of a design example of a FBG serving as the optical member in FIG. 3.
Figure 4B:
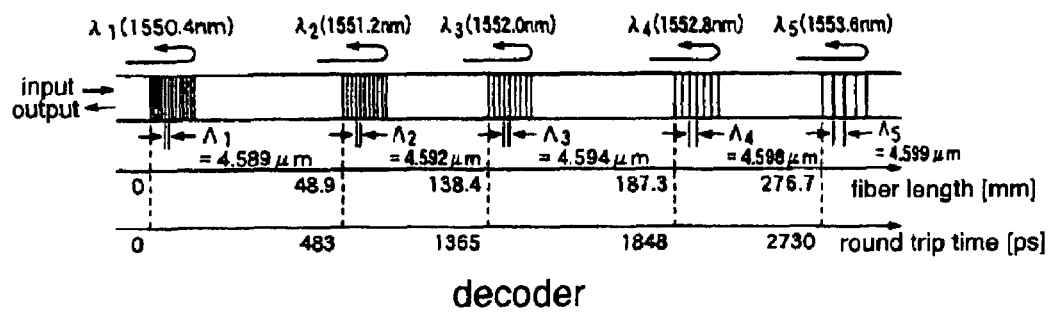

A block diagram showing an overall configuration of an OCDM transmission system according to the fourth embodiment is the same as that of the first embodiment, in shown FIG. 1. The OCDM transmission system according to the fourth embodiment differs from that according to the first embodiment in respect of a configuration corresponding to an internal configuration of the pre-compensation encoders 12-1, 12-2 as well as the dispersion equalization decoders 20-1, 20-2 according to the first embodiment, as shown in FIG. 4.

FIG. 9 shows a detailed configuration of pre-compensation encoders and dispersion equalization decoders according to the fourth embodiment of the invention, respectively.

Both the pre-compensation encoder and dispersion equalization decoder according to the fourth embodiment comprise a circulator 40, a wavelength multiplexer/demultiplexer 41 and movable mirrors 42-1 through 42-5 in number corresponding to the number of wavelengths, respectively. The configurations shown in FIG. 9 indicate a case where the number of wavelengths is five by way of example. The respective movable mirrors 42-1 through 42-5 are movable back-and-forth along reflection directions thereof, and an input/output end of the wavelength multiplexer/demultiplexer 41, for predetermined wavelengths, respectively, is positioned on a line extended along the respective reflection directions.

FIG. 9 shows a specific example of dispositions of the pre-compensation encoders as well as the dispersion equalization decoders in the case of the system specification being under the conditions shown in Table 2 as above. That is, numerical values of space length and round-trip delay time, shown in the figure, are set values for satisfying the conditions as shown in Table 2, shown for the sake of reference.

Figure 9A:
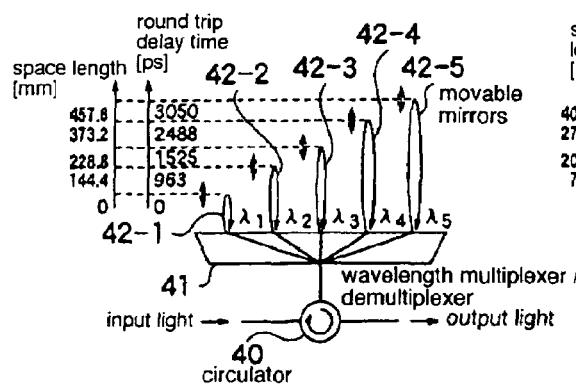
FIG. 9 is a block diagram showing an example of a detailed configuration of a pre-compensation encoder and a dispersion equalization decoder, respectively, according to a fourth embodiment of the invention.
Figure 9B:
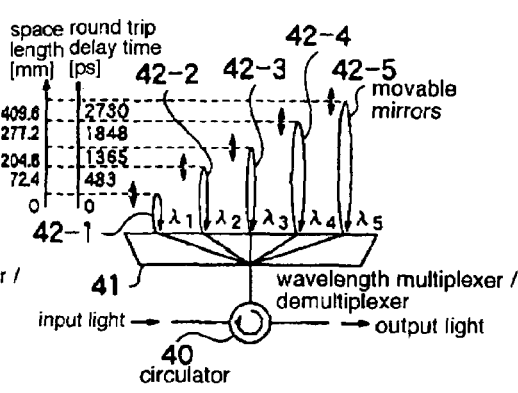

With the pre-compensation encoder or the dispersion equalization decoder, shown in FIG. 9(a) or FIG. 9(b), respectively, input light enters the wavelength multiplexer/demultiplexer 41 through the circulator 40. The wavelength multiplexer/demultiplexer 41 demultiplexes the input light into respective wavelength components to be sent out from the input/output end for the respective predetermined wavelengths. The respective wavelength components sent out from the respective input/output ends propagate over space, thereby reaching the movable mirrors 42-1 through 42-5, respectively. The respective wavelength components having reached the movable mirrors 42-1 through 42-5, respectively, are reflected by the movable mirrors 42-1 through 42-5, respectively, thereby returning to the original input/output ends, respectively, to be multiplexed again. Light after multiplexed is taken out through the circulator 40 to outgo as output light.

In the case of applying the configuration described above to the pre-compensation encoder, relative time difference in propagation time from demultiplexing by the wavelength multiplexer/demultiplexer 41 until re-multiplexing for the respective wavelength components is set so as to match time expressed by the expression (4), thereby enabling encoding by the method of time spread/wavelength hopping and pre-compensation to be concurrently implemented.

In the case of applying the configuration described above to the dispersion equalization decoder, relative time difference in propagation time from demultiplexing by the wavelength multiplexer/demultiplexer 41 until re-multiplexing for the respective wavelength components is set so as to match time expressed by the expression (5), thereby enabling encoding by the method of time spread/wavelength hopping and pre-compensation to be concurrently implemented.

Now, there is described a case of designing an encoder and decoder of Prime-hop group POH2 by way of example.

Following the system specification shown in Table 2 as described above, $\Delta Tci$ in the expression (1) described above and $\Delta Tti$ in the expression (3) described above become as follows, respectively.

$(\Delta Tc1, \Delta Tc2, \Delta Tc3, \Delta Tc4, \Delta Tc5) = (0, 240, 80, 320, 160)$ [ps]

$(\Delta Tt1, \Delta Tt2, \Delta Tt3, \Delta Tt4, \Delta Tt5) = (0, 1445, 2890, 4336, 5781)$ [ps]

Because the respective wavelengths propagate over space, if refractive index n=1, respective dispositions of the movable mirrors 42-1 through 42-5 of the encoder and decoder, respectively, found by use of the expressions (7) and (8), are as shown in FIG. 9. In this connection, values of round trip delay time, shown in FIG. 9, indicates difference in round trip delay time between respective wavelengths $\lambda 2$ through $\lambda 5$ and a wavelength $\lambda 1$.

With the configuration according the fourth embodiment, it is possible to obtain the same advantageous effect as that for the configuration according the first embodiment. Further, with the fourth embodiment, time delay difference for every wavelength component is generated depending on a distance between the wavelength multiplexer/demultiplexer 41 and the movable mirrors 42-1 through 42-5, respectively, unlike the case of the first embodiment using the FBG 32. Accordingly, even if the transmission line 5 differs from a design length, proper time spread/wavelength hopping can be implemented by adjusting a position of each of the movable mirrors 42-1 through 42-5 as appropriate.

For example, even if transmission lines of respective links of an optical network differ in length from each other, and shift in positions of respective wavelength components varies by the link, dispersion equalization can be coped with by shifting the positions of the respective movable mirrors 42-1 through 42-5 of the pre-compensation encoders and/or the dispersion equalization decoders, at respective nodes. It also means that optical transmitters and/or optical receivers with the pre-compensation encoders and/or the dispersion equalization decoders, having the same configuration, mounted therein, can be installed at the respective nodes of the optical network.

(E) Fifth Embodiment

Next, a fifth embodiment of the invention is described with reference to the drawings.

As with the fourth embodiment, a block diagram showing an overall configuration of an OCDM transmission system according to the fifth embodiment is the same as that of the first embodiment, shown in FIG. 1. The OCDM transmission system according to the fifth embodiment differs from that according to the first embodiment in respect of a configuration corresponding to the internal configuration of the pre-compensation encoders 12-1, 12-2 as well as the dispersion equalization decoders 20-1, 20-2 according to the first embodiment, as shown in FIG. 4.

Figure 10A:
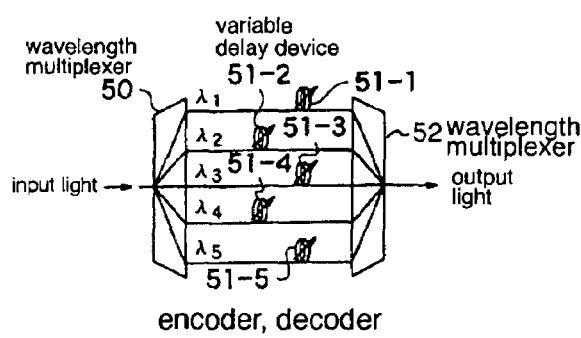
FIG. 10 is a block diagram showing an example of a detailed configuration of a pre-compensation encoder and a dispersion equalization decoder, respectively, according to a fifth embodiment of the invention.
Figure 10B:
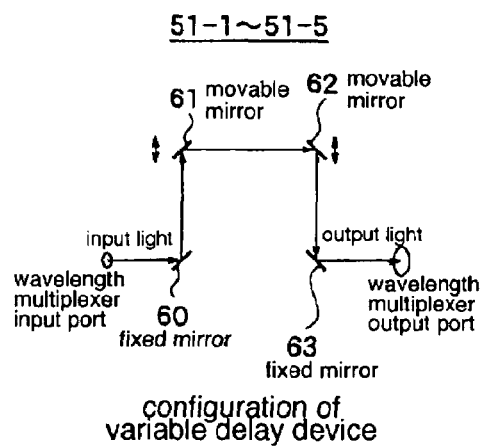

FIG. 10 shows a detailed configuration of a delay-by-wavelength optical member applied to pre-compensation encoders as well as dispersion equalization decoders according to the fifth embodiment.

As shown in FIG. 10(*a*), input light is demultiplexed into respective wavelength components by a wavelength demultiplexer 50. The respective wavelength components after demultiplexed are provided with time delay by variable delay devices 51-1 through 51-5, corresponding thereto, respectively, and subsequently, reach a wavelength multiplexer 52, whereupon the respective wavelength components are multiplexed by the wavelength multiplexer 52 to be thereby turned into output light. A configuration shown in FIG. 10(*a*) indicates a case where the number of wavelengths is five by way of example.

For the respective variable delay devices 51-1 through 51-5, shown in FIG. 10(*a*), use can be made of, for example, a configuration shown in FIG. 10(*b*). The respective variable delay devices shown in FIG. 10(*b*) comprise a fixed mirror 60 for bending an optical path of an optical signal from an output port of the wavelength demultiplexer 50 through 90 degrees counterclockwise, a movable mirror 61 for bending a path of the optical signal from the fixed mirror 60 through 90 degrees clockwise, a movable mirror 62 for bending a path of the optical signal from the movable mirror 61 through 90 degrees clockwise, and a fixed mirror 63 for bending a path of the optical signal from the movable mirror 62 through 90 degrees counterclockwise, thereby guiding the optical signal to an input port of the wavelength multiplexer 52.

Delay time of the variable delay devices, respectively, is determined on the basis of a length of an optical path from the output port of the wavelength demultiplexer 50 to the input port of the wavelength multiplexer 52 after passing through four sheets of the mirrors 60 through 63. Accordingly, various lengths of the optical path can be selected for each of the wavelengths by varying a distance between the movable mirrors 61, 62 and the fixed mirrors 60, 63, respectively, thereby enabling desired time delay difference to be generated between the respective wavelength components.

The fifth embodiment of the invention too can achieve the same advantageous effect as that for the fourth embodiment. Further, with the fifth embodiment, since different components are in use at the input and output ends of the variable delay device, respectively, although there is an increase in the number of necessary components as compared with the fourth embodiment, it becomes possible to increase numerical aperture of the wavelength multiplexer 52 for condensing the output light, so that conditions concerning a reflection angle and position of the respective mirrors can be eased in comparison with the fourth embodiment.

(F) Other Embodiments

The optical member for providing various time delay for every wavelength components, shown in the fourth embodiment and the fifth embodiment, can be applied to the encoders 12A-1, 12A-2 and the dispersion equalization decoders 20-1, 20-2, according to the second embodiment, or the pre-compensation encoders 12-1, 12-2 and decoders 20B-1, 20B-2, according to the third embodiment.

Further, the configuration of the dispersion equalization decoders and the pre-compensation encoders, described with reference to the respective embodiments described hereinbefore, can also be applied to decoders and encoders of an optical repeater for executing processing in the order of decoding, optical amplification, and encoding.

With the respective embodiments described hereinbefore, the encoders and decoders, having a similar configuration scheme, are shown, however, the encoders and decoders may have configurations differing from each other. For example, the encoders may have the configuration according to the first embodiment, and decoders may have the configuration according to the fourth or fifth embodiment.

Furthermore, the respective embodiments described hereinbefore have the configuration for multiplexing over two channels, however, the invention is applicable to a configuration for multiplexing over three or more channels. Needless to say, the invention is applicable to one-to-one communications.

As described in the foregoing, with the optical transmitter, optical receiver, and optical transmission system, according to the invention, instead of installing the configuration for exclusive use as the configuration for canceling out the chromatic dispersions of the transmission line, there are installed the encoders and/or the decoders, capable of canceling out the chromatic dispersions in the course of inherent operation thereof, thereby enabling reduction in cost as well as reduction in scale of elements constituting the system to be implemented.

What is claimed is:

1. An optical transmitter comprising an encoder for encoding multi-wavelength pulses corresponding to electric sending data by use of time spread/wavelength hopping in accordance with an encoding pattern of the encoder itself, wherein the encoder concurrently executes time delay for every wavelength component at encoding, and time delay due to pre-compensation processing to pre-compensate for difference in propagation time for every wavelength component, occurring due to chromatic dispersion characteristics of a transmission line between the optical transmitter and an optical receiver opposed thereto by $\alpha\%$ ($0 \leq \alpha \leq 100$), wherein the encoder is capable of varying time delay amounts for every wavelength component, wherein the encoder comprises a circulator, a wavelength multiplexer/demultiplexer, and movable mirrors in number corresponding to the number of wavelengths, and input light entering from an input terminal is delivered to the wavelength multiplexer/demultiplexer by the circulator to be demultiplexed into respective wavelength components, the respective wavelength components being reflected by the movable mirrors provided for the respective wavelength components, light rays reflected from the movable mirrors provided for the respective wavelength components, respectively, being multiplexed by the wavelength multiplexer/demultiplexer, and multiplexed light being sent out to an output terminal via the circulator to thereby execute time delay for the respective wavelength components.

2. The optical transmitter according to claim 1, wherein the encoder comprises a chirped Fiber Bragg Grating having a plurality of different diffraction gratings, formed in the longitudinal direction of a fiber, serving as an optical element for executing the time delays for every wavelength component.

3. An optical transmission system comprising an optical transmitter having an encoder for encoding multi-wavelength pulses corresponding to electric sending data by use of time spreadlwavelength hopping in accordance with an encoding pattern of the encoder itself, and an optical receiver having a decoder to which an optical signal transmitted by the optical transmitter and encoded by use of time spread/wavelength hopping is inputted, and for decoding the optical signal in accordance with a decoding pattern of the decoder itself, the optical transmitter and optical receiver being disposed so as to oppose each other with a transmission line interposed therebetween, wherein the optical transmitter according to claim 1 is in use as said optical transmitter.

4. An optical transmitter comprising an encoder for encoding multi-wavelength pulses corresponding to electric sending data by use of time spread/wavelength hopping in accordance with an encoding pattern of the encoder itself, wherein the encoder concurrently executes time delay for every wavelength component at encoding, and time delay due to pre-compensation processing to pre-compensate for difference in propagation time for every wavelength component, occurring due to chromatic dispersion characteristics of a transmission line between the optical transmitter and an optical receiver opposed thereto by $\alpha\%$ ($0 \leq \alpha \leq 100$), wherein the encoder is capable of varying time delay amounts for every wavelength component wherein the encoder comprises a wavelength demultiplexer, a plurality of sheets of mirrors including movable mirrors and a wavelength multiplexer, and input light entering from an input terminal is demultiplexed into respective wavelength components by the wavelength demultiplexer, optical signals for the respective wavelength components reaching the wavelength multiplexer after proceeding over optical paths formed by the plurality of sheets of the mirrors, corresponding to the respective wavelength components, whereupon the wavelength multiplexer multiplexes the optical signals for the respective wavelength components that have reached to be sent out to an output terminal, thereby executing time delay for the respective wavelength components.

5. The optical transmitter according to claim 4, wherein the encoder comprises a chirped Fiber Bragg Grating having a plurality of different diffraction gratings, formed in the longitudinal direction of a fiber, serving as an optical element for executing the time delays for every wavelength component.

6. An optical transmission system comprising an optical transmitter having an encoder for encoding multi-wavelength pulses corresponding to electric sending data by use of time spread/wavelength hopping in accordance with an encoding pattern of the encoder itself, and an optical receiver having a decoder to which an optical signal transmitted by the optical transmitter and encoded by use of time spread/wavelength hopping is inputted, and for decoding the optical signal in accordance with a decoding pattern of the decoder itself, the optical transmitter and optical receiver being disposed so as to oppose each other with a transmission line interposed therebetween, wherein the optical transmitter according to claim 4 is in use as said optical transmitter.

7. An optical receiver comprising a decoder to which an optical signal encoded by use of time spread/wavelength hopping is inputted, and for decoding the optical signal in accordance with a decoding pattern of the decoder itself, wherein the decoder concurrently executes time delay for every wavelength component at decoding, and time delay due to dispersion equalization processing to compensate for difference in propagation time for every wavelength component, occurring due to chromatic dispersion characteristics of a transmission line between the optical receiver and an optical transmitter opposed thereto by $\beta\%$ ($0 \leq \beta \leq 100$), wherein the decoder is capable of varying time delay amounts for every wavelength component, wherein the decoder comprises a circulator, a wavelength multiplexer/demultiplexer, and movable mirrors in number corresponding to the number of wavelengths, and input light entering from an input terminal is delivered to the wavelength multiplexer/demultiplexer by the circulator to be demultiplexed into respective wavelength components, the respective wavelength components being reflected by the movable mirrors provided for the respective wavelength components, light rays reflected from the movable mirrors provided for the respective wavelength components, respectively, being multiplexed by the wavelength multiplexer/demultiplexer, and multiplexed light being sent out to an output terminal via the circulator to thereby execute time delay for the respective wavelength components.

8. The optical receiver according to claim 7, wherein the decoder comprises a chirped Fiber Bragg Grating having a plurality of different diffraction gratings, formed in the longitudinal direction of a fiber, serving as an optical element for executing the time delays for every wavelength component.

9. An optical transmission system comprising an optical transmitter having an encoder for encoding multi-wavelength pulses corresponding to electric sending data by use of time spread/wavelength hopping in accordance with an encoding pattern of the encoder itself, and an optical receiver having a decoder to which an optical signal transmitted by the optical transmitter and encoded by use of time spread/wavelength hopping is inputted, and for decoding the optical signal in accordance with a decoding pattern of the decoder itself, the optical transmitter and optical receiver being disposed so as to oppose each other with a transmission line interposed therebetween, wherein the optical receiver according to claim 7 is in use as said optical receiver.

10. An optical receiver comprising a decoder to which an optical signal encoded by use of time spread/wavelength hopping is inputted, and for decoding the optical signal in accordance with a decoding pattern of the decoder itself, wherein the decoder concurrently executes time delay for every wavelength component at decoding, and time delay due to dispersion equalization processing to compensate for difference in propagation time for every wavelength component, occurring due to chromatic dispersion characteristics of a transmission line between the optical receiver and an optical transmitter opposed thereto by $\beta\%$ ($0 \leq \beta \leq 100$), wherein the decoder is capable of varying time delay amounts for every wavelength component, wherein the decoder comprises a wavelength demultiplexer, a plurality of sheets of mirrors including movable mirrors and a wavelength multiplexer, and input light entering from an input terminal is demultiplexed into respective wavelength components by the wavelength demultiplexer, optical signals for the respective wavelength components reaching the wavelength multiplexer after proceeding over optical paths formed by the plurality of sheets of the mirrors, corresponding to the respective wavelength components, whereupon the wavelength multiplexer multiplexes the optical signals for the respective wavelength components that have reached to be sent out to an output terminal, thereby executing time delay for the respective wavelength components.

11. The optical transmitter according to claim 10, wherein the encoder comprises a chirped Fiber Bragg Grating having a plurality of different diffraction gratings, formed in the longitudinal direction of a fiber, serving as an optical element for executing the time delays for every wavelength component.

12. An optical transmission system comprising an optical transmitter having an encoder for encoding multi-wavelength pulses corresponding to electric sending data by use of time spread/wavelength hopping in accordance with an encoding pattern of the encoder itself, and an optical receiver having a decoder to which an optical signal transmitted by the optical transmitter and encoded by use of time spread/wavelength hopping is inputted, and for decoding the optical signal in accordance with a decoding pattern of the decoder itself, the optical transmitter and optical receiver being disposed so as to oppose each other with a transmission line interposed therebetween, wherein the optical receiver according to claim 10 is in use as said optical receiver.

13. An optical transmission system comprising an optical transmitter having an encoder for encoding multi-wavelength pulses corresponding to electric sending data by use of time spread/wavelength hopping in accordance with an encoding pattern of the encoder itself, and an optical receiver having a decoder to which an optical signal transmitted by the optical transmitter and encoded by use of time spread/wavelength hopping is inputted, and for decoding the optical signal in accordance with a decoding pattern of the decoder itself, the optical transmitter and optical receiver being disposed so as to oppose each other with a transmission line interposed therebetween, wherein an optical transmitter comprising an encoder for encoding multi-wavelength pulses corresponding to electric sending data by use of time spread/wavelength hopping in accordance with an encoding pattern of the encoder itself, wherein the encoder concurrently executes time delay for every wavelength component at encoding, and time delay due to pre-compensation processing to pre-compensate for difference in propagation time for every wavelength component, occurring due to chromatic dispersion characteristics of a transmission line between the optical transmitter and an optical receiver opposed thereto by $\alpha\%$ ($0 \leq \alpha \leq 100$) is in use as said optical transmitter while an optical receiver comprising a decoder to which an optical signal encoded by use of time spread/wavelength hopping is inputted, and for decoding the optical signal in accordance with a decoding pattern of the decoder itself, wherein the decoder concurrently executes time delay for every wavelength component at decoding, and time delay due to dispersion equalization processing to compensate for difference in propagation time for every wavelength component, occurring due to chromatic dispersion characteristics of a transmission line between the optical receiver and an optical transmitter opposed thereto by $\beta\%$ ($0 \leq \beta \leq 100$) is in use as said optical receiver, and the sum of $\alpha\%$ in connection with pre-compensation processing at said optical transmitter and $\beta\%$ in connection with dispersion equalization processing at said optical receiver is 100%.

* * * * *